(12) United States Patent
Schaefer et al.

(10) Patent No.: US 10,015,483 B2
(45) Date of Patent: Jul. 3, 2018

(54) SET TOP BOX HEALTH AND CONFIGURATION

(71) Applicant: DISH Technologies L.L.C., Englewood, CO (US)

(72) Inventors: Germar Schaefer, Monument, CO (US); Danny J. Minnick, Littleton, CO (US)

(73) Assignee: DISH Technologies LLC., Englewood, CO (US)

( * ) Notice: Subject to any disclaimer, the term of this patent is extended or adjusted under 35 U.S.C. 154(b) by 0 days.

(21) Appl. No.: 15/639,871

(22) Filed: Jun. 30, 2017

(65) Prior Publication Data

US 2017/0366806 A1 Dec. 21, 2017

Related U.S. Application Data

(63) Continuation of application No. 13/037,302, filed on Feb. 28, 2011, now Pat. No. 9,736,469.

(51) Int. Cl.
*H04N 17/04* (2006.01)
*H04N 21/4223* (2011.01)
(Continued)

(52) U.S. Cl.
CPC ......... *H04N 17/04* (2013.01); *H04N 21/4126* (2013.01); *H04N 21/4223* (2013.01); *H04N 21/4424* (2013.01); *H04N 21/4425* (2013.01); *H04N 21/4882* (2013.01); *H04N 21/6582* (2013.01)

(58) Field of Classification Search
None
See application file for complete search history.

(56) References Cited

U.S. PATENT DOCUMENTS 4,809,325 A 2/1989 Hayashi et al.
4,837,414 A 6/1989 Edamula
(Continued)

FOREIGN PATENT DOCUMENTS

CA 2 634 951 A1 1/2010
CN 1352765 A 6/2002
(Continued)

OTHER PUBLICATIONS

European Search Report for EP 11 846 858.6 dated Jun. 12, 2017, all pages.
(Continued)

*Primary Examiner* — Michael R Telan
(74) *Attorney, Agent, or Firm* — Kilpatrick Townsend & Stockton LLP

(57) ABSTRACT

Disclosure is directed to determining a condition of the television receiver and communicating information regarding that condition to end-points that are external to the television receiver. The television receiver may create a two-dimensional barcode with information regarding the receiver condition and output the two-dimensional barcode for display on a display device. Once displayed on the display device, the two-dimensional barcode may be scanned into a mobile device where the information regarding the receiver condition may be stored, processed and/or forwarded to another location or device.

20 Claims, 7 Drawing Sheets

(51) Int. Cl.
*H04N 21/41* (2011.01)
*H04N 21/658* (2011.01)
*H04N 21/488* (2011.01)
*H04N 21/4425* (2011.01)
*H04N 21/442* (2011.01)

(56) References Cited

U.S. PATENT DOCUMENTS

| | | |
|---|---|---|
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,929,849 A | 7/1999 | Kikinis |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 9,280,515 B2 | 3/2016 | Gaede et al. |
| 9,329,966 B2 | 5/2016 | Dugan et al. |
| 9,367,669 B2 | 6/2016 | Gratton |
| 9,571,888 B2 | 2/2017 | Casagrande et al. |
| 9,596,500 B2 | 3/2017 | Gomez et al. |
| 9,652,108 B2 | 5/2017 | Mountain |
| 2001/0037297 A1 | 11/2001 | McNair |
| 2001/0052133 A1 | 12/2001 | Pack et al. |
| 2002/0011521 A1 | 1/2002 | Lahey et al. |
| 2002/0027612 A1 | 3/2002 | Brill et al. |
| 2002/0049980 A1 | 4/2002 | Hoang |
| 2002/0065728 A1 | 5/2002 | Ogasawara |
| 2002/0082931 A1 | 6/2002 | Siegel et al. |
| 2002/0112250 A1 | 8/2002 | Koplar et al. |
| 2002/0195495 A1 | 12/2002 | Melick et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0125092 A1 | 7/2003 | Burnhouse et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2004/0049672 A1 | 3/2004 | Nollet et al. |
| 2004/0260850 A1 | 12/2004 | Yu et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1 | 8/2005 | Andrew et al. |
| 2005/0203854 A1 | 9/2005 | Das |
| 2005/0258250 A1 | 11/2005 | Melick et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0090179 A1 | 4/2006 | Hsu et al. |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0159522 A1 | 7/2007 | Neven |
| 2007/0174198 A1 | 7/2007 | Kasahara |
| 2007/0192723 A1 | 8/2007 | Anzelde et al. |
| 2007/0200335 A1 | 8/2007 | Tuschel |
| 2007/0205596 A1 | 9/2007 | Mizuno et al. |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |

(56) References Cited

U.S. PATENT DOCUMENTS

| | | |
|---|---|---|
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1* | 8/2009 | Bisti ............... G06F 21/36 382/100 |
| 2009/0200367 A1* | 8/2009 | Arnouse ............ G06F 15/02 235/375 |
| 2009/0212112 A1 | 8/2009 | Li et al. |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0004984 A1 | 1/2010 | Beyabani |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1* | 9/2010 | Sao .................. H04L 51/38 345/520 |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1* | 5/2011 | de los Reyes ..... H04N 21/4425 725/118 |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1 | 12/2011 | Arya et al. |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |

(56) References Cited

U.S. PATENT DOCUMENTS

| | | |
|---|---|---|
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2016/0066050 A1 | 3/2016 | Gerhards et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |
| CN | 101 409 027 A | 4/2009 |
| CN | 101 873 467 A | 10/2010 |
| CN | 101 894 113 A | 11/2010 |
| CN | 101 895 772 A | 11/2010 |
| DE | 23 36 711 A1 | 2/1975 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| EP | 2 643 769 A1 | 10/2013 |
| FR | 2 565 748 A1 | 12/1985 |
| FR | 2 929 467 A1 | 10/2009 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2000-222116 A | 8/2000 |
| JP | 2002-215768 A | 8/2002 |
| JP | 3929450 | 6/2007 |
| JP | 2007-213548 A | 8/2007 |
| JP | 2008-244556 A | 10/2008 |
| JP | 2008-276716 | 11/2008 |
| JP | 2009-140204 A | 6/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 9/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2004/019442 A2 | 3/2004 |
| WO | 2005/109338 A1 | 11/2005 |
| WO | 2007/009005 A1 | 1/2007 |
| WO | 2009/056897 A1 | 5/2009 |
| WO | 2009/057651 A1 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 2012/071176 A1 | 5/2012 |

OTHER PUBLICATIONS

Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
"Android App Reviews & Showcase Just a Tapp Away," Android Tapp, 10pp. Found online at http://www.androidtapp.com/download-the-weather-channel-android-app-from-your-tv/, Oct. 22, 2010.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Byford, D., "Universal Interactive Device," International Business Machines Corporation, Jun. 1998, 1 page.
Costedio, K., "Bluefly QR Codes Debut on TV," 2 pp. Found online at http://www.barcode.com/Mobile-Barcode-news/bluefly-qr-codes-debut-on-tv.html, Oct. 22, 2010.
First Examination Report from European Patent Office dated May 18, 2015 for EP 11849496.2, 7 pages.
Examination Search Report from the European Patent Office dated Dec. 4, 2015 for EP 12707418.5, 8 pages.
Extended European Search Report for EP 12152690.9 dated Jun. 19, 2012, 9 pages.
European Office Action for EP 12716751.8 dated Nov. 11, 2015, 4 pages.
Extended European Search Report for EP 11842890.3 dated Mar. 26, 2014, 8 pages.
European Office Action for EP 11842890.3 dated Mar. 13, 2015, 8 pages.
European Office Action for EP 11842890.3 dated May 9, 2016, all pages.
Extended European Search Report for EP 11850819.1 dated Mar. 17, 2014, 5 pages.
Office Action for EP 11850819.1 dated Nov. 12, 2015, 4 pages.
Office Action for EP 12705768.5 dated May 25, 2016, all pages.
Extended European Search Report for EP 11846486 dated Mar. 26, 2014, 5 pages.
Extended European Search Report for EP 11852630 dated Jun. 30, 2014, 7 pages.
Office Action for Korean Patent Application No. 10-2013-7015610 dated Oct. 21, 2016, all pages.
Office Action for Korean Patent Application No. 10-2013-7015610 dated Feb. 21, 2017, all pages.
Office Action from European Patent Office for Application No. 11852630.0 dated May 12, 2015, 7 pages.
European Search Report for EP 11844504 dated Feb. 24, 2015, 10 pages.
European Search Report for EP 11855065 dated Mar. 6, 2014, 6 pages.
Notice of Allowance for Canadian Application 2,818,585 dated Apr. 3, 2017, 1 page.
Notice of Allowance for Canadian Application 2,828,463 dated Apr. 4, 2017, 1 page.
Office Action for CA 2,818,585 dated Nov. 28, 2016, all pages.
Office Action for EP 11811502.1 dated Aug. 29, 2016, all pages.
Office Action for EP 11855065 dated Mar. 13, 2015, 6 pages.

(56) References Cited

OTHER PUBLICATIONS

First Office Action by the Mexican Institute of Industrial Property for Mexican Patent Application No. MX/a/2013/009881 dated Aug. 14, 2014, 3 pages.
Notice of Allowance by the Mexican Institute of Industrial Property for Mexican Patent Application No. MX/a/2013/009881 dated Jan. 12, 2015, 1 page.
Publication of Brazil appln No. BR 11 2013 012218-8 on Aug. 9, 2016, 1 page.
Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
International Search Report and Written Opinion of PCT/US2011/059977 dated Mar. 19, 2012, 7 pages.
International Preliminary Report on Patentability of PCT/US2011/059977 dated Jun. 6, 2013, 6 pages.
International Preliminary Report on Patentability of PCT/US2012/048032 dated Apr. 3, 2014, 6 pages.
International Search Report and Written Opinion of PCT/US11/60002 dated Feb. 15, 2012, 7 pages.
International Preliminary Report on Patentability for PCT/US2011/060002 dated Jun. 6, 2013, 6 pages.
International Search Report and Written Opinion of PCT/US11/60094 dated Mar. 30, 2012, 7 pages.
International Preliminary Report on Patentability for PCT/US2011/060094 dated Jun. 20, 2013, 6 pages.
International Search Report and Written Opinion of PCT/US11/60104 dated Mar. 29, 2012, 9 pages.
International Search Report and Written Opinion of PCT/US2011/60121 dated Feb. 14, 2012, 7 pages.
International Preliminary Report on Patentability for PCT/US2011/060121 dated Jun. 20, 2013, 6 pages.
International Search Report and Written Opinion of PCT/US11/61074 dated Jan. 6, 2012, 11 pages.
International Search Report and Written Opinion of PCT/US11/61211 dated Mar. 29, 2012, 8 pages.
International Preliminary Report on Patentability for PCT/US2011/061211 dated Jul. 4, 2013, 7 pages.
International Search Report and Written Opinion of PCT/US11/61773 dated Feb. 21, 2012, 7 pages.
International Preliminary Report on Patentability for PCT/US2011/061773 dated Jun. 6, 2013, 6 pages.
International Search Report and Written Opinion of PCT/US11/61778 dated Mar. 2, 2012, 7 pages.
International Preliminary Report on Patentability for PCT/US2011/061778 dated Jul. 11, 2013, 6 pages.
International Search Report and Written Opinion of PCT/US11/63111 dated Apr. 4, 2012, 9 pages.
International Preliminary Report on Patentability of PCT/US2011/063111 dated Jun. 13, 2013, 8 pages.
International Search Report and Written Opinion of PCT/US2011/064709 dated Apr. 10, 2012, 8 pages.
International Search Report and Written Opinion of PCT/US2011/060098 dated Mar. 29, 2012, 10 pages.
International Preliminary Report on Patentability for PCT/US2011/060098 dated Jun. 13, 2013, 9 pages.
International Search Report and Written Opinion of PCT/US2011/063308 dated Mar. 29, 2012, 10 pages.
International Preliminary Report on Patentability for PCT/US2011/063308 dated Jul. 18, 2013, 9 pages.
International Search Report and Written Opinion of PCT/US2011/068161 dated Jun. 14, 2012, 19 pages.
International Preliminary Report on Patentability of PCT/US2011/068161 dated Jul. 25, 2013, 13 pages.
International Search Report and Written Opinion of PCT/US2011/068176 dated Mar. 29, 2012, 15 pages.
International Search Report and Written Opinion of PCT/US2012/021657 dated May 23, 2012, 12 pages.
International Search Report of PCT/US2012/022581 dated Oct. 8, 2012, 18 pages.
International Preliminary Report on Patentability for PCT/US2012/022581 dated Aug. 8, 2013, 12 pages.
International Search Report and Written Opinion of PCT/US2012/022405 dated Apr. 19, 2012, 11 pages.
International Preliminary Report on Patentability for PCT/US2012/022405 dated Aug. 8, 2013, 7 pages.
International Search Report and Written Opinion of PCT/US2012/024923 dated May 22, 2012, 12 pages.
International Preliminary Report on Patentability for PCT/US2012/024923 dated Aug. 29, 2013, 8 pages.
International Search Report and Written Opinion of PCT/US2012/024956 dated Jun. 11, 2012, 10 pages.
International Preliminary Report on Patentability for PCT/US2012/024956 dated Aug. 29, 2013, 7 pages.
International Search Report and Written Opinion of PCT/US2012/025502 dated Jun. 8, 2012, 13 pages.
International Preliminary Report on Patentability of PCT/US2012/025502 dated Sep. 6, 2013, 9 pages.
International Search Report and Written Opinion of PCT/US2012/025607 dated Jun. 8, 2012, 13 pages.
International Preliminary Report on Patentability for PCT/US2012/025607 dated Sep. 12, 2013, 8 pages.
International Search Report and Written Opinion of PCT/US2012/025634 dated May 7, 2012, 8 pages.
International Preliminary Report on Patentability for PCT/US2012/025634 dated Sep. 6, 2013, 5 pages.
International Search Report and Written Opinion of PCT/US2012/026373 dated Jun. 13, 2012, 14 pages.
International Preliminary Report on Patentability for PCT/US2012/026373 dated Sep. 12, 2013, 10 pages.
International Search Report and Written Opinion of PCT/US2012/026624 dated Aug. 29, 2012, 14 pages.
International Preliminary Report on Patentability for PCT/US2012/026624 dated Sep. 12, 2013, 12 pages.
International Search Report and Written Opinion of PCT/US2012/026722 dated Jun. 28, 2012, 11 pages.
International Search Report and Written Opinion of PCT/US2012/048032, dated Oct. 16, 2012, 14 pages.
International Search Report and Written Opinion of PCT/US2011/060109 dated Feb. 14, 2012, 7 pages.
International Preliminary Report on Patentability for PCT/US2011/060109 dated Jun. 20, 2013, 7 pages.
First Examination Report from European Patent Office dated Feb. 4, 2015 for EP 12716751.8, 4 pages.
First Office Action for CN 201180065044.7 dated Feb. 13, 2015 by the State Intellectual Property Office (SIPO), 4 pages.
First Office Action with Search Report for CN 201280013891.3 dated Jan. 15, 2016, 13 pages.
Second Office Action CN 201280013891.3 dated Aug. 12, 2016, all pages.
Second Office Action for CN 201180065044.7 dated Sep. 9, 2015 by the State Intellectual Property Office (SIPO), 23 pages.
Office Action from European Patent Office for Application No. 12716728.6 dated Feb. 26, 2015, 5 pages.
Notice of Allowance and search report for ROC (Taiwan) Patent Application No. 101106288 received May 29, 2015, 9 pages.
Office Action of the Intellectual Property Office for ROC Patent App. No. 101101486 dated Aug. 5, 2014, 4 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
Office Action from State Intellectual Property Office for CN Appln. No. 201180056242.7 received Jun. 17, 2015, 10 pages.
Second Office Action from State Intellectual Property Office for CN Appln. No. 201180056242.7 dated Jan. 26, 2016, all pages.
Third Office Action from State Intellectual Property Office for CN Appln. No. 201180056242.7 dated Jul. 28, 2016, all pages.
First Office Action and Search Report from State Intellectual Property Office for CN Appln. No. 201180064527.5 dated Oct. 23, 2015, 10 pages.

(56) References Cited

OTHER PUBLICATIONS

Second Office Action from State Intellectual Property Office for CN Appln. No. 201180064527.5 dated Jun. 12, 2016, all pages.
(Translation) Rejection Decision for CN Appln. No. 201180064527.5 dated Oct. 9, 2016, all pages.
The First Office Action dated Sep. 11, 2014 for Mexican Patent Application No. MX/a/2013/007672 is not translated into English, 2 pages.
The Second Office Action dated Jun. 1, 2015 for Mexican Patent Application No. MX/a/2013/007672 is not translated into English, 2 pages.
Office Action dated Mar. 2, 2017 for KR 10-2013-7020865, all pages.
Notice to Grant received Jun. 9, 2017 for KR 10-2013-7020865, all pages.
Notice of Allowance dated Nov. 10, 2015 for Mexican Patent Application No. MX/a/2013/007672, 1 page.
The First Office Action dated Jul. 13, 2015 for Mexican Patent Application No. MX/a/2013/009791 is not translated into English, 2 pages.
Notice of Allowance for Mexican Patent Application No. MX/a/2013/009791 dated Mar. 15, 2016, 1 page.
Office Action dated Nov. 12, 2014 for Mexican Patent Application No. MX/a/2013/009794, 2 pages.
Office Action dated Oct. 17, 2016 for European Patent Appln. No. 12701638.4, all pages.
Notice of Allowance dated Feb. 18, 2015 for Mexican Patent Application No. MX/a/2013/009794, 1 page.
The First Office Action for Mexican Patent Application No. MX/a/2013/006262 is not translated into English. This document is from prosecution of the corresponding foreign matter for which we do not have a translation. dated Aug. 7, 2014, 2 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Jan. 28, 2015 for Mexican Patent Application No. MX/a/2013/006973, 9 pages.
Notice of Allowance for Mexican Patent Application No. MX/a/2013/006973 dated Sep. 4, 2015, 1 page.
Office Action dated Dec. 5, 2014 for Mexican Patent Application No. MX/a/2013/009882, 2 pages.
Office Action for European Patent App. 12704473.3 dated Apr. 29, 2016, all pages.
The Second Office Action dated Apr. 22, 2015 for Mexican Patent Application No. MX/a/2013/009883, 2 pages.
Supplementary European Search Report for EP 11843423 completed Mar. 23, 2016, 8 pages.
Supplementary European Search Report for EP 11843045 completed Mar. 31, 2016, all pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp. 8, XP031887368, DOI: 10.1109/MTAS.2005.207166; ISBN: 978-981-05-4573-4, 8 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Publication of BR 11 2014 020007-6 A2 on Jun. 20, 2017, 1 page.

Publication of PCT/US2011/059977 by the India Controller General of Patents Designs and Trademarks as India Patent Publication No. 4694/CHENP/2013 A on Sep. 5, 2014,1 page.
Publication of PCT/US2012/025634 by the India General Patents Designs and Trademarks as India Patent Publication No. 6967/CHENP/2013 A dated Aug. 1, 2014, 1 page.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Conned," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
First Office Action including Search Report from the State Intellectual Property Office for CN Patent Appln. No. 201280014034.5 dated Apr. 5, 2016, all pages.
First Office Action and Search Report from the State Intellectual Property Office (SIPO) for CN 201180056249.9 dated Feb. 3, 2016, all pages.
Notice of Decision to Grant for KR 10-2013-7024307 dated Apr. 14, 2017, 2 pages.
Second Office Action issued by State Intellectual Property Office (SIPO) for CN 201180056249.9 dated Feb. 4, 2017, all pages.
Office Action and Search Report from the State Intellectual Property Office for CN Pat. Appln. No. 201180066584.7 dated Jul. 10, 2015, 12 pages.
Second Office Action issued by State Intellectual Property Office for CN Pat. Appln. No. 201180066584.7 dated Jan. 11, 2016, 5 pages.
Office Action and Search Report for ROC (Taiwan) Patent Application No. 10014870 dated May 7, 2014, issued in the corresponding foreign application, 9 pages.
Office Action for Korean Patent Application No. 10-2013-7020207 dated Dec. 21, 2016, all pages.
Decision to Grant for Korean Patent Application No. 10-2013-7020207 dated Mar. 9, 2017, all pages.
Office Action and Search Report for ROC (Taiwan) Patent Application No. 100149344 dated Jan. 23, 2015, 8 pages.
Search Report for Patent Application ROC (Taiwan) Patent Application No. 100149344 dated Oct. 28, 2015, 1 page.
Office Action and Search Report for ROC (Taiwan) Pat. Appln. No. 101106313 received May 12, 2016, all pages.
Office Action and Search Report for Roc (Taiwan) Pat. Appln. No. 101106313 received Nov. 4, 2016, all pages.
Office Action and Search Report for ROC (Taiwan) Patent Application No. 100142966 dated May 27, 2014, 6 pages.
Office Action for European Patent Application No. 12707435.9 dated Mar. 12, 2015, 6 pages.
Office Action for European Patent Application No. 12719817.4 dated Jun. 23, 2014 issued in the corresponding foreign application, 5 pages.
First Office Action for CN 201280010873 dated Mar. 2, 2016, all pages.
Notice of Decision to Grant for CN 201280010873 dated Mar. 25, 2016, all pages. (not in English).

(56) References Cited

OTHER PUBLICATIONS

Notice of Allowance for Canadian Application 2,822,214 dated Nov. 28, 2016, 1 page.
U.S. Appl. No. 14/179,336, filed Feb. 12, 2014, Non-Final Office Action dated May 22, 2014, 14 pages.
U.S. Appl. No. 14/179,336, filed Feb. 12, 2014 Final Office Action dated Dec. 1, 2014, 30 pages.
U.S. Appl. No. 14/179,336, filed Feb. 12, 2014 Notice of Allowance dated Feb. 18, 2015, 15 pages.
U.S. Appl. No. 13/302,717, filed Nov. 22, 2011 Non Final Rejection dated Jun. 16, 2016, all pages.
U.S. Appl. No. 13/302,717, filed Nov. 22, 2011 Non Final Rejection dated Dec. 2, 2015, 27 pages.
U.S. Appl. No. 13/302,717, filed Nov. 22, 2011 Final Rejection dated May 8, 2015, 44 pages.
U.S. Appl. No. 13/302,717, filed Nov. 22, 2011 Non-Final Rejection dated Dec. 18, 2014, 71 pages.
U.S. Appl. No. 12/958,073, filed Dec. 1, 2010, Office Action dated Aug. 31, 2012, 12 pages.
U.S. Appl. No. 12/958,073, filed Dec. 1, 2010, Notice of Allowance dated Jan. 17, 2013, 17 pages.
U.S. Appl. No. 12/961,369, filed Dec. 6, 2010, Non-Final Office Action dated Mar. 9, 2012, 17 pages.
U.S. Appl. No. 12/964,478, filed Dec. 9, 2010, Non-Final Office Action dated Mar. 26, 2013, 19 pages.
U.S. Appl. No. 12/964,478, filed Dec. 9, 2010, Final Office Action dated Sep. 16, 2013, 12 pages.
U.S. Appl. No. 12/971,349, filed Dec. 17, 2010, Office Action dated Nov. 10, 2011, 9 pages.
U.S. Appl. No. 12/971,349, filed Dec. 17, 2010, Final Office Action dated Jan. 20, 2012, 10 pages.
U.S. Appl. No. 12/961,369, filed Dec. 6, 2010, Notice of Allowance dated Jul. 16, 2014, 15 pages.
U.S. Appl. No. 12/961,369, filed Dec. 6, 2010, Final Rejection dated Oct. 30, 2012, 17 pages.
U.S. Appl. No. 12/961,369, filed Dec. 6, 2010, Non-Final Office Action dated Mar. 25, 2013, 17 pages.
U.S. Appl. No. 12/961,369, filed Dec. 6, 2010, Non-Final Office Action dated Jul. 12, 2013, 22 pages.
U.S. Appl. No. 12/961,369, filed Dec. 6, 2010, Non-Final Office Action dated Feb. 13, 2014, 21 pages.
U.S. Appl. No. 12/971,349, filed Dec. 7, 2010, Notice of Allowance dated Oct. 2, 2013, 24 pages.
U.S. Appl. No. 12/971,349, filed Dec. 7, 2010), Final Rejection dated Oct. 24, 2012, 11 pages.
U.S. Appl. No. 12/971,349, filed Dec. 17, 2010, Office Action dated Jul. 16, 2012, 11 pages.
U.S. Appl. No. 12/981,244, filed Dec. 29, 2010, Office Action dated Dec. 21, 2012, 23 pages.
U.S. Appl. No. 12/981,244, filed Dec. 29, 2010, Final Office Action dated Oct. 30, 2013, 10 pages.
U.S. Appl. No. 12/981,244, filed Dec. 29, 2010, Notice of Allowance dated Mar. 25, 2014, 17 pages.
U.S. Appl. No. 12/984,385, filed Jan. 4, 2011, Notice of Allowance dated Nov. 28, 2012, 11 pages.
U.S. Appl. No. 12/984,385, filed Jan. 4, 2011, Office Action dated Jul. 12, 2012, 16 pages.
U.S. Appl. No. 12/986,721, filed Jan. 7, 2011, Office Action dated Mar. 16, 2012, 6 pages.
U.S. Appl. No. 12/986,721, filed Jan. 7, 2011, Notice of Allowance dated Jun. 21, 2012, 7 pages.
U.S. Appl. No. 12/953,227, filed Nov. 23, 2010, Final Office Action dated May 24, 2013, 17 pages.
U.S. Appl. No. 12/953,227, filed Nov. 23, 2010, Office Action dated Oct. 7, 2012, 31 pages.
U.S. Appl. No. 12/953,227, filed Nov. 23, 2010, Non Final Office action dated Mar. 24, 2015, 39 pages.
U.S. Appl. No. 12/953,227, filed Nov. 23, 2010, Final Office Action dated Nov. 6, 2015, 26 pages.
U.S. Appl. No. 12/953,227, filed Nov. 23, 2010, Notice of Allowance dated May 9, 2017, all pages.
U.S. Appl. No. 13/015,382, filed Jan. 27, 2011, Office Action dated Nov. 13, 2012, 7 pages.
U.S. Appl. No. 13/015,382, filed Jan. 27, 2011, Notice of Allowance dated Feb. 22, 2013, 12 pages.
U.S. Appl. No. 13/016,483, filed Jan. 28, 2011 Office Action dated Nov. 2, 2012, 18 pages.
U.S. Appl. No. 13/016,483, filed Jan. 28, 2011 Final Office Action dated Jun. 27, 2013, 13 pages.
U.S. Appl. No. 13/016,483, filed Jan. 28, 2011 Non-Final Office Action dated Nov. 3, 2014, 33 pages.
U.S. Appl. No. 13/016,483, filed Jan. 28, 2011 Final Office Action dated May 13, 2015, 34 pages.
U.S. Appl. No. 13/016,483, filed Jan. 28, 2011 Non-Final Office Action dated Dec. 14, 2015, 27 pages.
U.S. Appl. No. 13/016,483, filed Jan. 28, 2011 Final Office Action dated Jul. 5, 2016, all pages.
U.S. Appl. No. 13/035,474, filed Feb. 25, 2011 Non Final Rejection dated Feb. 17, 2015, 57 pages.
U.S. Appl. No. 12/953,273, filed Nov. 23, 2010, Notice of Allowance, dated Oct. 18, 2012, 11 pages.
U.S. Appl. No. 12/965,645, filed Dec. 10, 2010, Non-Final Office Action, dated Jul. 19, 2013, 20 pages.
U.S. Appl. No. 12/965,645, filed Dec. 10, 2010, Final Office Action, dated Mar. 18, 2014, 24 pages.
U.S. Appl. No. 12/965,645, filed Dec. 10, 2010, Notice of Allowance, dated Jun. 20, 2014, 35 pages.
U.S. Appl. No. 12/973,431, filed Dec. 20, 2010, Non-Final Rejection dated May 15, 2013, 30 pages.
U.S. Appl. No. 12/973,431, filed Dec. 20, 2010, Final Office Action dated Aug. 27, 2013, 11 pages.
U.S. Appl. No. 12/973,431, filed Dec. 20, 2010 Non-Final Rejection dated Dec. 19, 2014, 30 pages.
U.S. Appl. No. 12/973,431, filed Dec. 20, 2010 Notice of Allowance dated May 28, 2015, 20 pages.
U.S. Appl. No. 13/007,317, filed Jan. 14, 2011, Office action dated Dec. 19, 2012, 29 pages.
U.S. Appl. No. 13/010,557, filed Jan. 20, 2011, Final Rejection dated Jan. 16, 2014, 17 pages.
U.S. Appl. No. 13/010,557, filed Jan. 20, 2011, Non-Final Rejection dated Aug. 5, 2013, 17 pages.
U.S. Appl. No. 13/014,591, Notice of Allowance dated May 24, 2013, 32 pages.
U.S. Appl. No. 13/020,678, filed Feb. 3, 2011, Office Action dated Jul. 30, 2012, 15 pages.
U.S. Appl. No. 13/020,678, filed Feb. 3, 2011, Notice of Allowance dated Jan. 3, 2013, 13 pages.
U.S. Appl. No. 13/007,317, Notice of Allowance dated May 13, 2013, 16 pages.
U.S. Appl. No. 13/028,030, filed Feb. 15, 2011, Office Action dated Jan. 11, 2013, 14 pages.
U.S. Appl. No. 13/028,030, filed Feb. 15, 2011, Final Office Action dated Jul. 11, 2014, 43 pages.
U.S. Appl. No. 13/028,030, filed Feb. 15, 2011, Non-Final Office Action dated Feb. 6, 2015, 56 pages.
U.S. Appl. No. 13/028,030, filed Feb. 15, 2011, Final Office Action dated Jul. 17, 2015, 63 pages.
U.S. Appl. No. 13/031,115, Notice of Allowance dated Apr. 16, 2013, 24 pages.
U.S. Appl. No. 13/034,482, filed Feb. 24, 2011 Notice of Allowance dated Aug. 29, 2014, 45 pages.
U.S. Appl. No. 13/034,482, filed Feb. 24, 2011, Final Office Action dated Apr. 25, 2013, 19 pages.
U.S. Appl. No. 13/034,482, filed Feb. 24, 2011, Office Action dated Oct. 19, 2012, 11 pages.
U.S. Appl. No. 13/035,474, filed Feb. 25, 2011, Office Action dated Oct. 30, 2012, 11 pages.
U.S. Appl. No. 13/035,474, filed Feb. 25, 2011, Final Rejection dated Mar. 29, 2013, 20 pages.
U.S. Appl. No. 13/035,474, filed Feb. 25, 2011, Non Final Rejection dated Mar. 6, 2014, 20 pages.

(56) References Cited

OTHER PUBLICATIONS

U.S. Appl. No. 13/035,474, filed Feb. 25, 2011 Final Rejection dated Aug. 27, 2014, 38 pages.
U.S. Appl. No. 13/035,474, filed Feb. 25, 2011 Non Final Rejection dated Sep. 11, 2015, 65 pages.
U.S. Appl. No. 12/960,285, filed Dec. 3, 2010 Non-Final Office Action dated May 14, 2015, 21 pages.
U.S. Appl. No. 12/960,285, filed Dec. 3, 2010 Final Office Action dated Dec. 3, 2014, 19 pages.
U.S. Appl. No. 12/960,285, filed Dec. 3, 2010, Non-Final Office Action dated Jun. 6, 2014, 19 pages.
U.S. Appl. No. 12/960,285, filed Dec. 3, 2010, Final Office Action dated Apr. 18, 2013, 14 pages.
U.S. Appl. No. 12/960,285, filed Dec. 3, 2010, Non-Final Office Action dated Dec. 6, 2012, 17 pages.
U.S. Appl. No. 12/960,285, filed Dec. 3, 2010, Notice of Allowance dated Nov. 18, 2015, 31 pages.
U.S. Appl. No. 13/006,270, filed Jan. 13, 2011, Non-Final Office Action dated Oct. 8, 2013, 20 pages.
U.S. Appl. No. 13/006,270, filed Jan. 13, 2011, Final Office Action dated May 9, 2014, 41 pages.
U.S. Appl. No. 13/006,270, filed Jan. 13, 2011 Non-Final Office Action dated Sep. 12, 2014, 41 pages.
U.S. Appl. No. 13/006,270, filed Jan. 13, 2011, Final Office Action dated Mar. 23, 2014, 51 pages.
U.S. Appl. No. 13/028,030, filed Feb. 15, 2011 Non-Final Office Action dated Dec. 17, 2013, 60 pages.
U.S. Appl. No. 13/035,525, filed Feb. 25, 2011, Office Action dated Jul. 18, 2012, 15 pages.
U.S. Appl. No. 13/035,525, filed Feb. 25, 2011, Final Office Action dated Jan. 31, 2013, 26 pages.
U.S. Appl. No. 13/035,525, filed Feb. 25, 2011, Non-Final Office Action dated May 15, 2013, 15 pages.
U.S. Appl. No. 13/035,525, filed Feb. 25, 2011, Final Office Action dated Sep. 12, 2013, 21 pages.
U.S. Appl. No. 13/037,302, filed Feb. 28, 2011, Office Action dated Mar. 1, 2013, 20 pages.
U.S. Appl. No. 13/037,302, filed Feb. 28, 2011, Final Office Action dated Oct. 16, 2013, 28 pages.
U.S. Appl. No. 13/037,302, filed Feb. 28, 2011, Final Office Action dated May 4, 2015, 54 pages.
U.S. Appl. No. 13/037,302, filed Feb. 28, 2011, Non-Final Office Action dated Jan. 12, 2016, 62 pages.
U.S. Appl. No. 13/037,302, filed Feb. 28, 2011, Final Office Action dated Jul. 12, 2016, all pages.
U.S. Appl. No. 13/037,302, filed Feb. 28, 2011, Notice of Allowance dated Feb. 16, 2017, all pages.
U.S. Appl. No. 13/037,312, filed Feb. 28, 2011, Office Action dated Aug. 15, 2012, 9 pages.
U.S. Appl. No. 13/037,312, filed Feb. 28, 2011, Notice of Allowance dated Jun. 13, 2013, 10 pages.
U.S. Appl. No. 13/037,312, filed Feb. 28, 2011, Final Office Action dated Feb. 28, 2013, 18 pages.
U.S. Appl. No. 13/037,316, filed Feb. 28, 2011, Office Action dated Jan. 30, 2013, 21 pages.
U.S. Appl. No. 13/037,316, filed Feb. 28, 2011, Final Office Action dated Aug. 28, 2013, 13 pages.
U.S. Appl. No. 13/037,333, filed Feb. 28, 2011, Notice of Allowance dated Jan. 18, 2013, 27 pages.
U.S. Appl. No. 13/192,287, filed Jul. 27, 2011, Notice of Allowance dated Dec. 14, 2015, 14 pages.
U.S. Appl. No. 13/192,287, filed Jul. 27, 2011, Final Office Action dated Jan. 28, 2014, 18 pages.
U.S. Appl. No. 13/192,287, filed Jul. 27, 2011, Non Final Office Action dated Jun. 13, 2013, 22 pages.
U.S. Appl. No. 13/673,480, filed Nov. 9, 2012, Office Action dated Jan. 16, 2013, 27 pages.
U.S. Appl. No. 13/673,480, filed Nov. 9, 2012 Final Office Action dated Sep. 9, 2013, 10 pages.
U.S. Appl. No. 13/673,480, filed Nov. 9, 2012 Notice of Allowance dated Nov. 12, 2013, 16 pages.
U.S. Appl. No. 13/475,794, filed May 18, 2012 Non-Final Office Action dated Sep. 18, 2013, 19 pages.
U.S. Appl. No. 13/475,794, filed May 18, 2012 Non-Final Office Action dated Nov. 21, 2014, 33 pages.
U.S. Appl. No. 13/475,794, filed May 18, 2012 Final Office Action dated Jun. 1, 2015, 45 pages.
U.S. Appl. No. 13/475,794, filed May 18, 2012 Non Final Office Action dated Jul. 29, 2016, all pages.
U.S. Appl. No. 13/475,794, filed May 18, 2012 Notice of Allowance dated Jan. 5, 2017, all pages.
U.S. Appl. No. 13/864,474, filed Apr. 17, 2013 Non Final Office Action dated Aug. 11, 2015, 59 pages.
U.S. Appl. No. 13/864,474, filed Apr. 17, 2013 Final Office Action dated Nov. 20, 2015, all pages.
U.S. Appl. No. 13/864,474, filed Apr. 17, 2013 Non Final Office Action dated Mar. 23, 2016, all pages.
U.S. Appl. No. 13/864,474, filed Apr. 17, 2013 Notice of Allowance dated Feb. 16, 2017, all pages.
U.S. Appl. No. 13/968,611, filed Aug. 16, 2013, Notice of Allowance dated May 2, 2014, 40 pages.
U.S. Appl. No. 13/968,611, filed Aug. 16, 2013, Non-Final Office Action dated Jan. 17, 2014, 21 pages.
U.S. Appl. No. 14/852,787, filed Sep. 14, 2015, Non-Final Office Action dated Sep. 14, 2016, all pages.
U.S. Appl. No. 14/852,787, filed Sep. 14, 2015, Final Office Action dated Jan. 13, 2017, all pages.
Third Office Action from State Intellectual Property Office for CN Appln. No. CN 201280013891.3 dated Dec. 30, 2016, all pages.

* cited by examiner

SET TOP BOX HEALTH AND CONFIGURATION

CROSS-REFERENCE TO RELATED APPLICATIONS

The present application is a continuation of U.S. Nonprovisional patent application Ser. No. 13/037,302, which was filed on Feb. 28, 2011, and entitled "Set Top Box Health and Configuration," which is hereby incorporated by reference in its entirety.

TECHNICAL FIELD

Embodiments discussed herein are generally directed to determining a condition of the television receiver and communicating information regarding that condition by a two-dimensional barcode that is displayed on a display device associated with the television receiver.

BACKGROUND

Cable television, satellite television, and other providers of program services typically provide customers with a television receiver that is adapted to receive and output program service content. The television receiver (one example of which is a set-top box) may, from time to time, malfunction or fail due to aging, normal wear and tear, or other causes. These malfunctions or failures may be an inconvenience to customers whose service may be interrupted while the television receiver is being repaired or replaced. In some cases, a customer may program his or her television receiver with recoding timers or certain customizable settings that may be lost when the receiver malfunctions or fails. Accordingly, there is a need to provide a user with a mechanism for anticipating and/or mitigating the effects of receiver failure or malfunction.

SUMMARY

Embodiments discussed herein are generally directed to determining a condition of the television receiver and communicating information regarding that condition to endpoints that are external to the television receiver. The receiver condition may be, for example, an error condition encountered in the operation of the receiver, or a receiver configuration or setting programmed by the user. The television receiver may create a two-dimensional barcode with information regarding the receiver condition and output the two-dimensional barcode for display on a display device. Once displayed on the display device, the two-dimensional barcode may be scanned into a mobile device where the information regarding the receiver condition may be stored, processed and/or forwarded to another location or device. For error conditions, the mobile device may forward the two-dimensional barcode or information encoded in the two-dimensional barcode to an appropriate party who may effect repairs. For receiver configurations or settings, the mobile device may store the configuration or settings for later user by the television receiver.

One embodiment is directed to a method of managing a television receiver, comprising: sensing a condition of a television receiver; in response to sensing the condition of the television receiver, creating a two-dimensional barcode with information corresponding to the condition of the television receiver; and outputting the two-dimensional barcode form the television receiver for display on a display device; wherein, when the two-dimensional barcode is scanned from the display device into a mobile device, the two-dimensional barcode conveys the information corresponding to the condition of the television receiver to the mobile device.

Another embodiment is directed to a television receiver, comprising: a tuner operable to receive a program service transmission having a plurality of channels, the tuner operable to select one of the channels and to prepare the channel to be output in a data signal to a display device; a memory connected to the tuner, the memory including a tangible storage medium operable to store computer readable data and instructions; a processor connected to the memory operable to run computer executable code stored in the memory; a sensing module configured to execute on the processor to sense a condition of a television receiver; an encoding module configured to execute on the processor to create a two-dimensional barcode with information corresponding to the condition of the television receiver; and an output module configured to execute on the processor to output the two-dimensional barcode from the television receiver for display on the display device; wherein, when the two-dimensional barcode is scanned from the display device into a mobile device, the two-dimensional barcode conveys the information corresponding to the condition of the television receiver to the mobile device.

Another embodiment is directed to a method, comprising: scanning a two-dimensional barcode into a mobile device, the two-dimensional barcode being displayed on a display device associated with television receiver; and transmitting information regarding the error condition from the mobile device to a service provider; wherein the service provider utilizes the information regarding the error condition to initiate repair of the television receiver.

Another embodiment is directed to a method, comprising: scanning a two-dimensional barcode into a mobile device, the two dimensional barcode being displayed on a display device associated with television receiver; decoding the two-dimensional barcode at the mobile device to determine one or more configuration settings for the television receiver; and storing the one or more configuration settings for later use in reconfiguring the television receiver.

DETAILED DESCRIPTION

Figure 1:
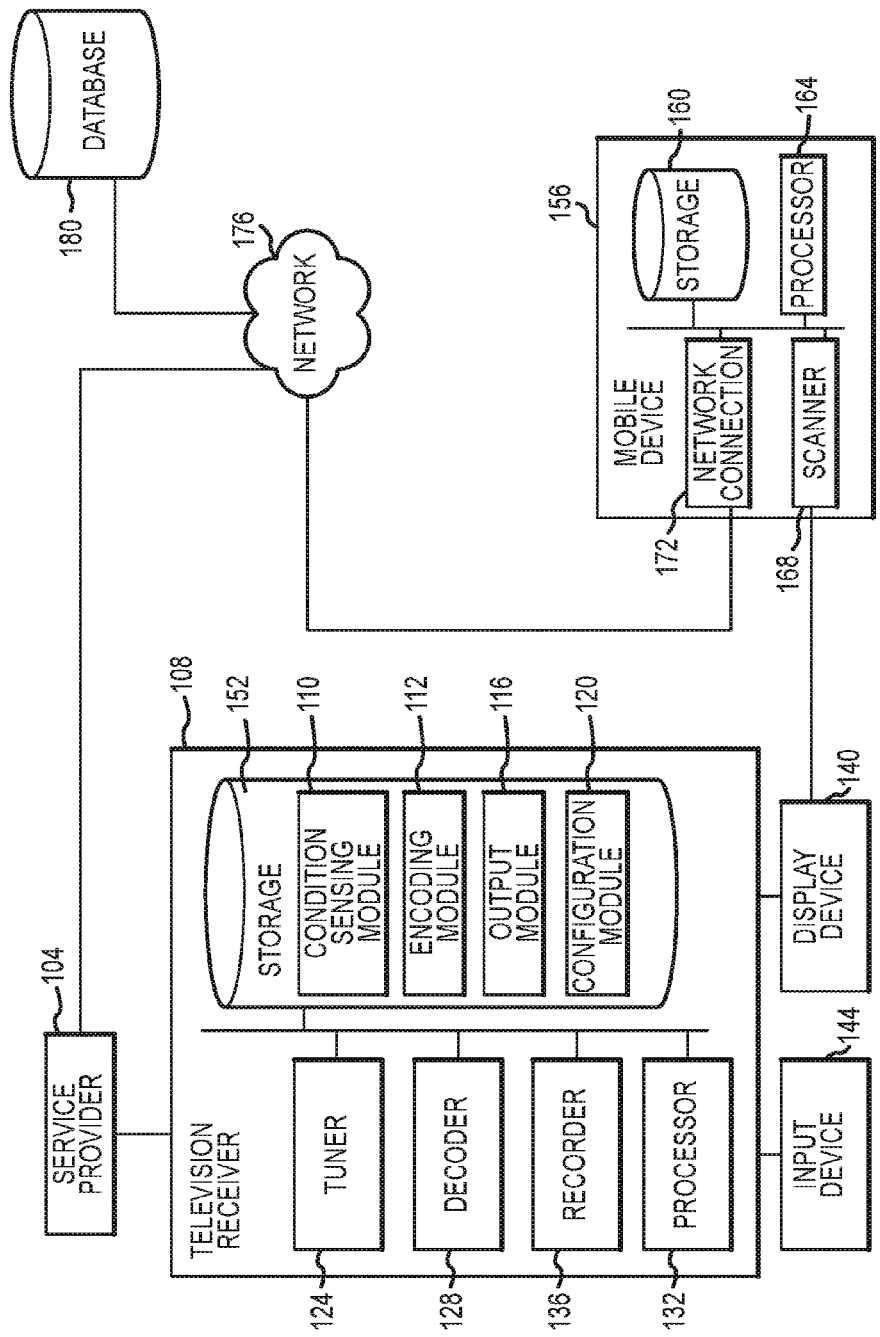
FIG. 1 is a schematic diagram showing a sample system, components and implementations discussed herein.

FIG. 1 is a schematic illustration of a general operating environment showing components and features of embodiments discussed herein. FIG. 1 includes a television receiver, generally identified by reference numeral 108. Embodiments discussed herein are generally directed to determining a condition of the television receiver 108 and communicating information regarding that condition to endpoints that are external to the television receiver 108. In certain instances, communicating information regarding receiver conditions is directed towards mitigating the inconveniences associated with malfunctions and/or failures of the television receiver 108. For example, in order to expedite repairs of the television receiver 108, the receiver may communicate information regarding error conditions that are encountered or otherwise sensed in the receiver's operations. In order to facilitate recovery from a catastrophic failure, the television receiver 108 may communicate information regarding settings or configurations that have been programmed by the user. The television receiver 108 may also communicate information regarding user-programmed configurations or settings in order to facilitate transfer of these configurations or settings into a different television receiver 108.

The receiver 108 depicted in FIG. 1 may be configured to communicate with or receive signals from a service provider 104 that broadcasts, transmits, or otherwise delivers a content service to a receiver 108. The receiver 108 can include a set-top box (STB), a digital video recorder (DVR), a cable receiver, a general purpose computing device, and so on. The receiver 108 may also include a cable modem that receives streaming video and/or audio. Generally, a "receiver" may be any device capable of receiving video and/or audio content included in a broadcast or other content service transmission from a service provider 104.

The receiver 108 may be associated with an individual, business or other entity, user or subscriber that receives a content service transmission from the service provider 104. Generally the terms "user" and/or "subscriber" refer to an individual or company who receives a content service transmission. This may include those who have purchased a subscription to the content service transmission. Alternatively or additionally, the terms "user" and/or "subscriber" may refer to individuals who have been given access to the content service transmission through promotional offers and/or other non-fee-based agreements.

As used herein, a "service provider" may include any service that provides a content transmission to a receiver 108 such as, without limitation, a satellite television service, a direct television service or a cable television service, or a streaming video delivered across a network such as the Internet. Accordingly, a "content service transmission" encompasses transmission of information across a cable network (for example from a cable headend to a cable receiver), an Internet or other computer-accessible medium (including a local area network, wide-area network, and so on), including Internet protocol television transmissions, a wireless network such as a radio frequency or infrared network, and so on.

In connection with embodiments that operate in the context of a satellite television service, the service provider 104 may provide a content service transmission through an uplink center. Such a satellite television service may utilize a direct broadcast satellite (DBS) system, which can incorporate packetized transmission signals according to an appropriate standard, such as the MPEG-2 and/or MPEG-4 standards. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers 108. In connection with embodiments that operate in the context of a cable television service, the service provider 104 may provide a content service transmission to a headend, which, in turn, delivers the content service transmission to the receiver 108.

The receiver 108 may include a tuner 124 operable to receive the content service transmission signal from the service provider 104 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module or other signal output portion, which may process the video and audio streams using digital-to-analog conversion techniques, or compressed digital to uncompressed digital conversion techniques, to produce one or more output signals. The output signals may be sent to a display device 140, such as a television or monitor in order to display content to a user.

The receiver 108 may include or be associated with a recorder 136, such as a digital video recorder (DVR). The recorder 136 may be integrated into the receiver 108 or may be a stand alone device. The recorder 136 may be operated by a user who programs the device or receiver function to record a particular program at a specified time. When the program occurs, the recorder 136 will record and store the program, which can then be viewed later. In addition to this functionality, the recorder 136 may buffer a certain amount of content during a live transmission. Buffering a live transmission allows a user to pause and/or rewind the content of the transmission and to then display the content in a non-live or delayed manner.

The receiver 108 may include or be associated with a memory or other storage device 152, such as magnetic or optical storage. The storage device 152 may be operable to store data received from the decoded content transmission signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable. The stored data set may include audio and/or visual content to be transmitted and output through a display device, such as a television or monitor. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 132 operable to run executable code in connection with various functions associated with the receiver 108. For example, the processor 132 may display graphics, images, animations or other content through an output device, such as a television or monitor. The storage device 152 may store an application, file, or other data that is useable by the processor 132. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 132.

The processor 132 may also perform such tasks as executing commands received from a user. User commands may be sent to the receiver 108 through a user input device 144 such as remote or other wireless device. As used herein, a "user input device" may include any device operable to receive input from a user and to convey the input to the receiver 108. In one embodiment, the user input device 144 may be a hand-held device having a number of buttons or keys that when actuated by a user cause the user input device to covey information to the receiver 108 using a suitable communication means, such as an infrared signal. The user input device 144 may include a pointing device or functionality that allows the user to control the position of a cursor that is displayed on an output device. For example, the user input device 144 may include a track ball or glide plane that may be manipulated to control cursor movements. The user input device 144 may include a motion sensor or accelerometer that allows a user to control displayed items or graphics, such as a cursor, through movements of his or her hand or arm that cause a displacement of the user input device 144. It should be appreciated that other input devices such as a computer mouse or touch screen may be used and other communication means, wired or wireless, may be used. Information sent to the receiver 108 may include, for example, a command to change the output channel. Commands sent to the receiver 108 may be entered through a dedicated display menu.

The storage device 152 may store units of processor executable code in the form of one or more modules configured to implement certain functions described herein. Embodiments discussed herein are directed to determining a condition of a television receiver 104 and communicating that condition to a mobile device 156. In determining the condition of the television receiver 104, the storage device 152 may include a condition sensing module 110 that is configured to detect a receiver condition such as an error that occurs during the operation of the receiver 104. In some instances, receiver condition sensed by the condition sensing module 110 may be a user-configurable setting such as a favorite channel list or recordings timers.

In communicating with the mobile device 156, the television receiver 108 typically encodes a two-dimensional barcode with at least information regarding the receiver condition and outputs the two-dimensional barcode for display on a display device 140. As used herein, a "two-dimensional barcode" is a machine readable representation of data that includes a pattern of bars, squares, dots, hexagons or other geometric forms. The geometric forms are arranged within the two-dimensional barcode to form a message according to a predefined symbology that defines the meaning of various symbols. In some implementations, the two-dimensional barcode may arrange symbols in a grid or matrix. In other implementations, the symbols of the two-dimensional barcode may be arranged in a circular patterns. In still other implementations, steganography techniques may be used to encode symbols within an image in such a way that a viewer is not aware of the symbols. One example of a two-dimensional barcode is QR code, developed by the Denso-Wave corporation of Japan. Another example of a two-dimensional barcode is Aztec code, developed by Andrew Longacre, Jr. and Robert Hussey.

The receiver 104 may include an encoding module 112 configured to create a two-dimensional barcode with one or more codes corresponding to the receiver condition sensed by the condition sensing module 110. Once the encoding module 112 create the appropriate information in a two-dimensional barcode, an output module 116 may output the two-dimensional barcode from the television receiver 104 for display on the display device 140. Once displayed on the display device 140, the two-dimensional barcode may be scanned into the mobile device 156 where the information regarding the receiver condition may be stored, processed and/or forwarded to another location or device. In accordance with certain embodiments, the output module 116 may be configured to output the two-dimensional barcode to a printer device. For example, the output module 116 may print the two-dimensional barcode if a television or other display device 140 is unavailable (e.g., the display device 140 may be broken or malfunctioning). Once the two-dimensional barcode is printed to a piece of paper, the mobile device 156 may scan the paper to aquire the two-dimensional bar code.

Generally, the mobile device 156 may include a processor 164 operable to load and store various processor-executable modules stored in the storage device 160. The mobile device 148 may additionally include an input device, such a keypad or keyboard, and an output device, such as an LED or LCD screen. In addition to processor-executable code, the storage device 160 may store data associated with two-dimensional barcodes that are scanned into the mobile device 156 from the receiver 108. In this regard, the mobile device 156 may include a scanner 168 that is operable to scan or otherwise read a two-dimensional barcode. In one embodiment, the scanner 168 may be a photo-sensor or laser scanner that operates by sweeping a beam of light across a surface that displays the two-dimensional barcode. In other embodiments, the scanner 168 may be charge-coupled device, such a digital camera, that is operable to capture an image of the two-dimensional barcode. In connection with capturing an image of the two-dimensional barcode, the mobile device 156 may be configured to extract information contained in the two-dimensional barcode using digital signal processing or other appropriate techniques.

The mobile device 156 may be operable to transfer content across a network 176 to a database 180 or to the service provider 104. Network transactions may be conducted through the operation of a network interface 172, such as a modem network interface card, cable plug or jack, and so on. Using the interface, the mobile device 156 may communicate over a network 176, such as a packet switched network or a circuit switched network, one example of which is the public switched telephone network (PSTN). It should be appreciated that the network 176 may be any type of network capable of data communication, such as, for example, a local or wide area network or the Internet. The mobile device 156 may communicate through a network connection using any suitable communication protocol such as TCP/IP.

The type of receiver condition that is communicated by the television receiver 104 may determine the type of action taken by the mobile device 156 once the mobile device 156 scans the two-dimensional barcode. In one instance, the television receiver 104 may communicate an error condition that has occurred or is occurring in the operations of the television receiver 104. In this instance, the mobile device 156 may forward the two-dimensional barcode or information encoded in the two-dimensional barcode to an appropriate party who may effect repairs. In another instance, the television receiver 104 may communicate one or more configuration settings for the television receiver or a user input device 144 associated with the television receiver 108. In this instance, the mobile device 156 may store the configuration settings for later user by the television receiver 108.

The receiver 108 may additionally include a configuration module 120 that may be utilized in those instances where configuration settings for the television receiver 108 or the user input device 144 are communicated to the mobile device 156. Specifically, the configuration module 120 may re-configure the television receiver 108 and/or the user input device 144 according to settings that have been previously stored by the mobile device 156. For example, the configuration module 120 may be utilized to recover from a catastrophic failure by reloading configuration settings lost in the failure. Here, the configuration module may connect to a storage medium used by the mobile device 156 to store configuration settings and then download the stored settings for use in reconfiguring the television receiver 108 or the user input device 144.

Figure 2:
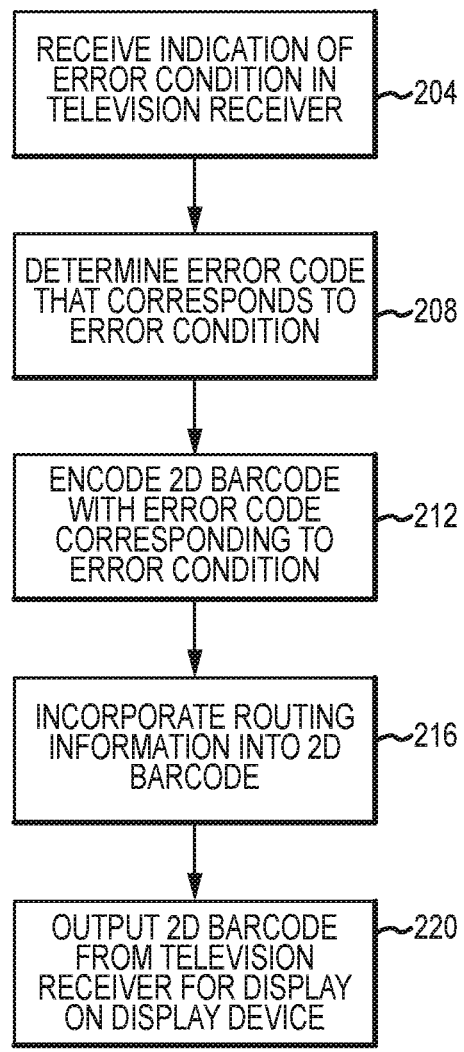
FIG. 2 is a flow chart that illustrates a method executed by the television receiver illustrated in FIG. 1.

FIG. 2 is a flow chart that illustrates a method of communicating an error condition that is present in a television receiver 108. Initially, in operation 204, the condition sensing module 110 receives an indication of an error condition occurring in the television receiver 108. The error condition may be, for example, the failure of a particular part or component of the television receiver 108. Following operation 204, operation 208 may be executed.

In operation 208, the condition sensing module 110 determines an error code that corresponds to the error condition sensed in operation 204. The condition sensing module 110 may be configured to include a list or table of various error codes that classify the various errors which are known to occur in a television receiver 108. The error codes used in operation 208 may be used to facilitate rapid and accurate recognition of the error condition by technicians or other personnel who will be called upon to repair the television receiver 108. The error codes may be specific to a particular service provider who provides content service transmission to the television receiver 108. Alternatively, the error codes may be a generally recognized scheme of error classification recognized by various service providers within the cable and/or satellite television industry. Following operation 208, operation 212 may be executed.

In operation 212, the encoding module 112 creates a two-dimensional barcode with the error code corresponding to the error condition as determined or classified in operation 208. Following operation 212, operation 216 may be executed. In operation 216, the encoding module 112 may incorporate routing information into the two-dimensional barcode. Following operation 216, operation 220 may be executed. In operation 220, the output module 116 may output the two-dimensional barcode which is created in operations 212 and 216 from the television receiver 108 for display on the display device 140. The routing information incorporated in operation 216 may be used by the mobile device 156 in order to properly direct or otherwise route the error code information from the mobile device to the service provider 104. In one embodiment, the routing information may include a uniform resource locater (URL), which may be used by the mobile device 156 to access a particular website through a browser or other web interface operating on the mobile device 156. Through the website accessed through the URL, the mobile device 156 may enter an error code such that the error code is transmitted across the network 176 to be received by the service provider 104.

Figure 3A:
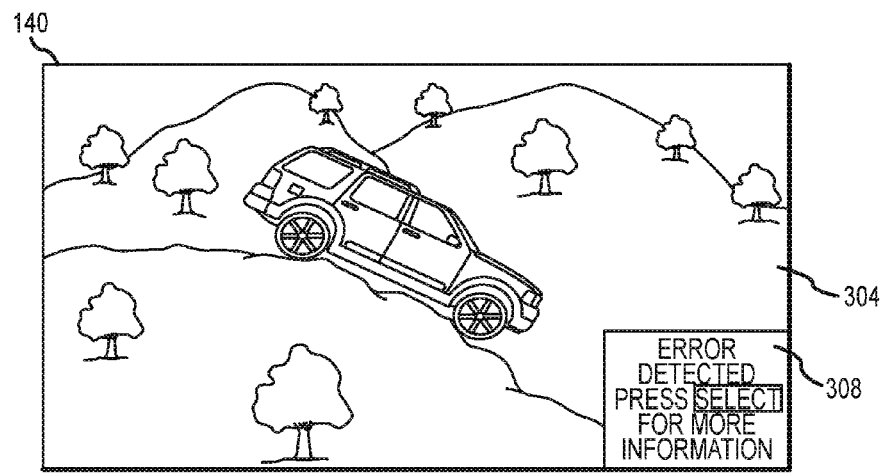
FIG. 3A-3C are illustrations of outputs shown on a display device in connection with the operation of the method illustrated in FIG. 2.
Figure 3B:
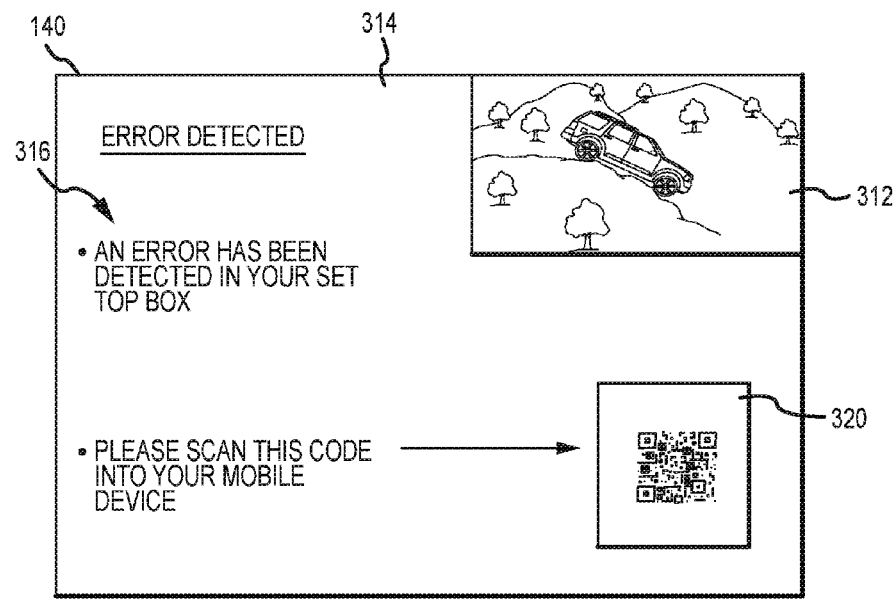
Figure 3C:
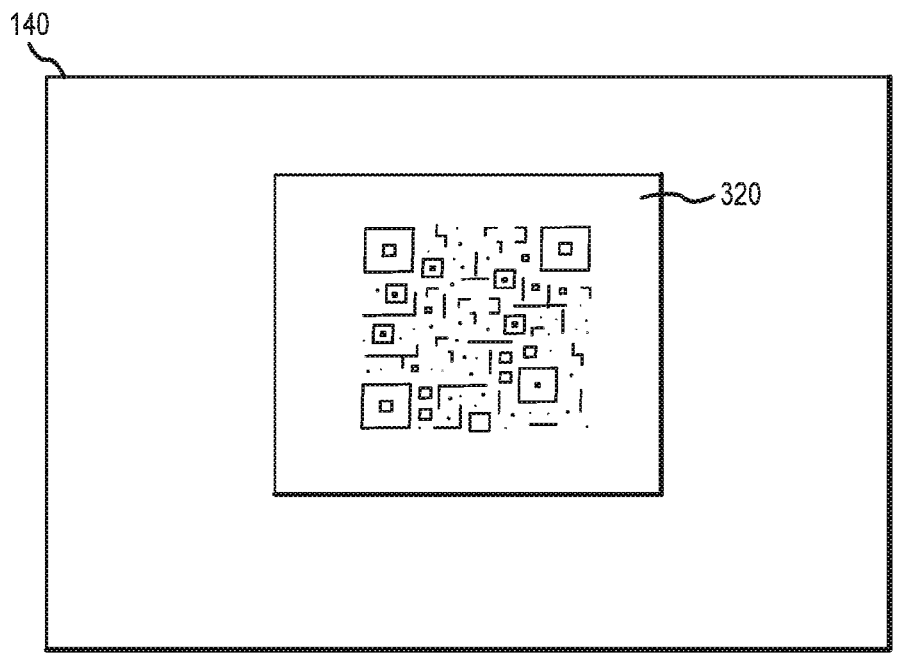

FIGS. 3A-3C are illustrations of output mechanisms such as graphical user interfaces and/or prompts that may be used to communicate an error condition from a television receiver using a two-dimensional barcode. FIG. 3A includes a graphical illustration of output shown or visible on the display device 140. In FIG. 3A, the display device 140 shows program content 304, which is received by the television receiver 108 from the service provider 104 and output on the display device 140. Additionally in FIG. 3A, the display device 140 shows a "pop up" or icon 308 that is overlaid on top of the program content 304. The icon 308 includes an error message that informs the user or viewer that the television receiver 108 has detected an internal error or error condition. The icon 308 may include a message that specifies the manner in which the user may take action to learn more about the error condition and/or to mitigate the error condition. For example, the icon 308 may include a message that says, for example, press info or select to receive more information.

FIG. 3B is an illustration of output from the display device 140 that may be displayed in response to a user selecting or otherwise responding to the icon displayed in FIG. 3A. The menu displayed in FIG. 3B may be a graphical user interface or other menu that takes up a substantial portion of the display device 140. In certain embodiments, a portion of the surface area of the display device 140 may be reserved for a scaled down or smaller window that displays the normal program content. As shown in FIG. 3B, the window 312 includes program contents otherwise visible during display of normal programming. The error detection menu 314 shown in FIG. 3B may include error message 316 that provides more detailed information concerning the error detected within the television receiver 108. (It should be appreciated that in certain embodiments all information related to the error condition may displayed to the user through one or more messages that are overlaid over broadcast content.) Additionally, the message 316 may include directions or other instructions for a user to scan a two-dimensional barcode 320 that is displayed on the display device 140. As discussed in connection with FIG. 2, the two-dimensional barcode 320 may include an encoding of an error code corresponding to the error condition and/or routing information usable to direct the error code to the proper service provider 104 through network transactions initiated across the network 176. In connection with the display of the two-dimensional barcode 320, a user may scan the two-dimensional barcode 320 into his or her mobile device 156. As described above, scanning the two-dimensional barcode 320 may include photographing the two-dimensional barcode 320 using a camera or scanner 168 incorporated into the mobile device 156.

In certain instances, the error condition sensed in operation 204 may be sufficiently critical to the function of the television receiver 108 that the condition sensing module 110 may determine that a failure of the television receiver is imminent. In such circumstances, the output module 116 may be configured to stop other programming content from being output to the display device 140 and instead output only a two-dimensional barcode encoded with the error condition determined in operation 204. Such an output is shown in FIG. 3C. As shown in FIG. 3C, the display device 140 includes a two-dimensional barcode 320 displayed by itself in a central location on the display device 140. In response to such a display, the user may scan or photograph the two-dimensional barcode 320 and communicate the information contained therein to the service provider 104, as appropriate.

Figure 4:
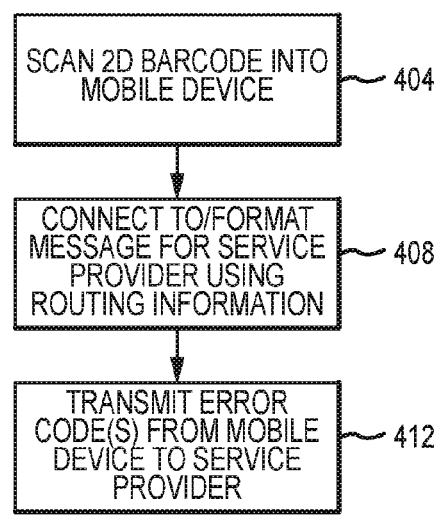
FIG. 4 is a flow chart that illustrates a method executed by the mobile device illustrated in FIG. 1.

FIG. 4 is a flow chart that illustrates a method of receiving the two-dimensional barcode 320 from a television receiver 108 into a mobile device 156 and for communicating the information contained therein to the service provider 104. Initially, in operation 404, the mobile device 156 may scan the displayed two-dimensional barcode 320. In operation 404 a specifically designed two-dimensional barcode scanner or a camera may scan or photograph the two-dimensional barcode as it is displayed on the display device 104. Following operation 404 operation, 408 may be executed.

In operation 408, the mobile device 156 may connect to the service provider 104 using routing information contained in the two-dimensional barcode received in operation 408. Connecting to the service provider may include initiating a network transaction across the network 176 using TCP/IP protocol or other appropriate methods of network communication. Additionally, operation 408 may include formatting a message which is to be sent across the network 176. Such messages may include e-mail or MMS-type messaging formats. Following operation 408, operation 412 may be executed. In operation 412, the mobile device 156 may transmit error codes from the mobile device to the service provider 104. Alternatively or in combination, operation 412 may include transmitting a scanned image of the two-dimensional barcode such as in an email or MMS message.

Figure 5:
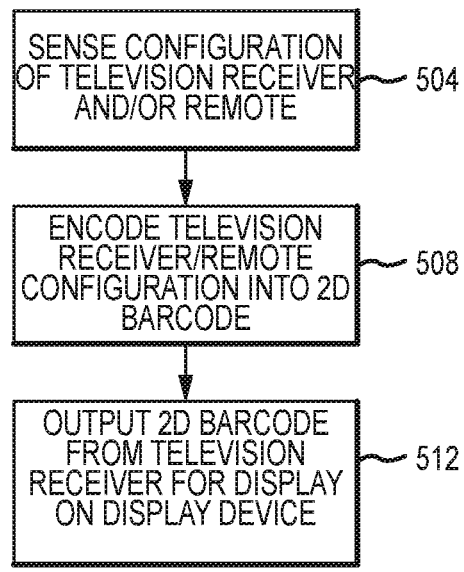
FIG. 5 is a flow chart that illustrates another method executed by the television receiver illustrated in FIG. 1.

FIG. 5 is a flow chart that illustrates a method of communicating a configuration setting associated with a television receiver 108. Initially, in operation 504, the condition sensing module 110 senses the state or other configuration of the television receiver 108. As used herein, the configuration of the television receiver may include such user-programmable or adjustable settings as favorite channels, specific recording timers, and so on. Operation 504 may additionally include sensing a configuration of a programmable remote control or other input device 144. Specifically, the input device 144 may include certain buttons or other input mechanisms that are programmed by a user to have a specific function. Such user-programmed characteristics of the television receiver 108 and/or remote 144 are sensed and recorded by the condition sensing module 110 in operation 504. Following operation 504, operation 508 may be executed.

In operation 508, the encoding module 112 may create the television receiver 108 and/or remote 144 configuration into a two-dimensional barcode. Following operation 508, operation 512 may be executed. In operation 512, the output module 116 may output the two-dimensional barcode created in operation 508 from the television receiver 108 to the display device 140.

Figure 6:
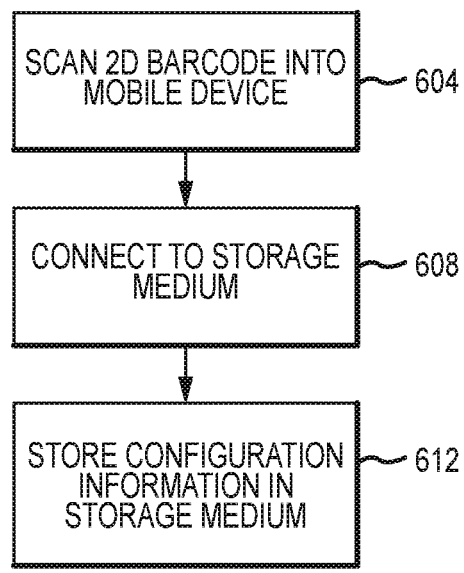
FIG. 6 is a flow chart that illustrates another method executed by the mobile device illustrated in FIG. 1.

FIG. 6 is a flow chart that illustrates a method of receiving configuration information and storing that configuration information by a mobile device 176. Initially, in operation 604, the mobile device 156 scans the two-dimensional barcode into the mobile device 156. Operation 604 may include the use of a scanner or camera 168 that scans or photographs the two-dimensional barcode as it is displayed on the display device 140. Following operation 604, operation 608 may be executed.

In operation 608, the mobile device 156 may connect to a storage medium. The storage medium in one embodiment may include the storage device 160 incorporated internally into the mobile device 156. In other embodiments, the storage medium may be a database 180 that is accessed by the mobile device 156 through a network transaction occurring across the network 176. Following operation 608, operation 612 may be executed. In operation 612, the mobile device 156 may store the configuration information in the storage medium accessed in operation 608.

Figure 7A:
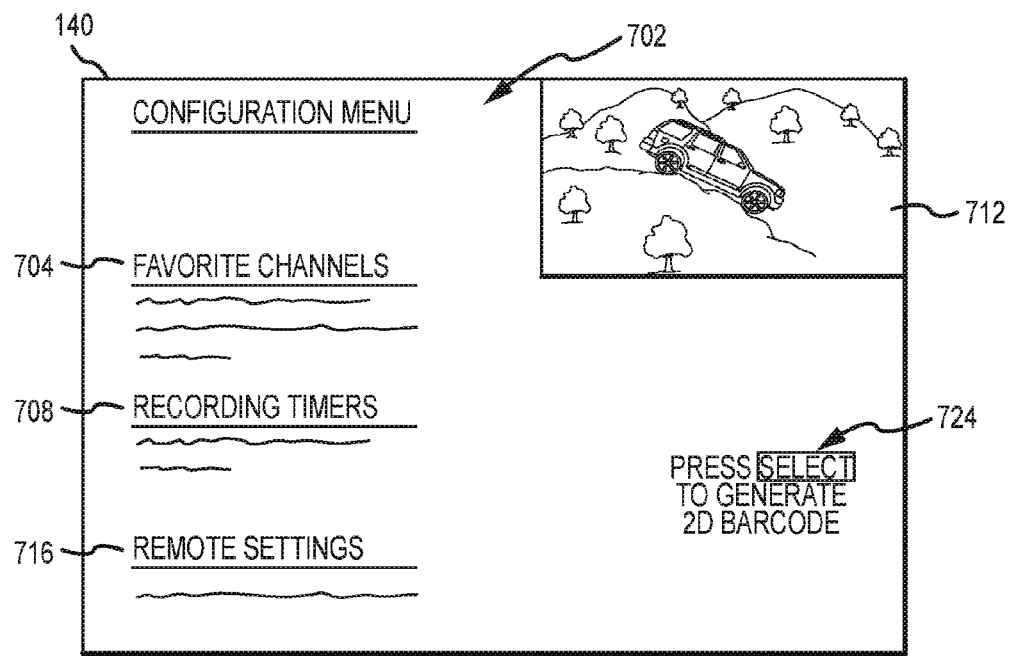
FIG. 7A-7B are illustrations of output shown on a display device in connection with the operation of the method illustrated in FIG. 5.
Figure 7B:
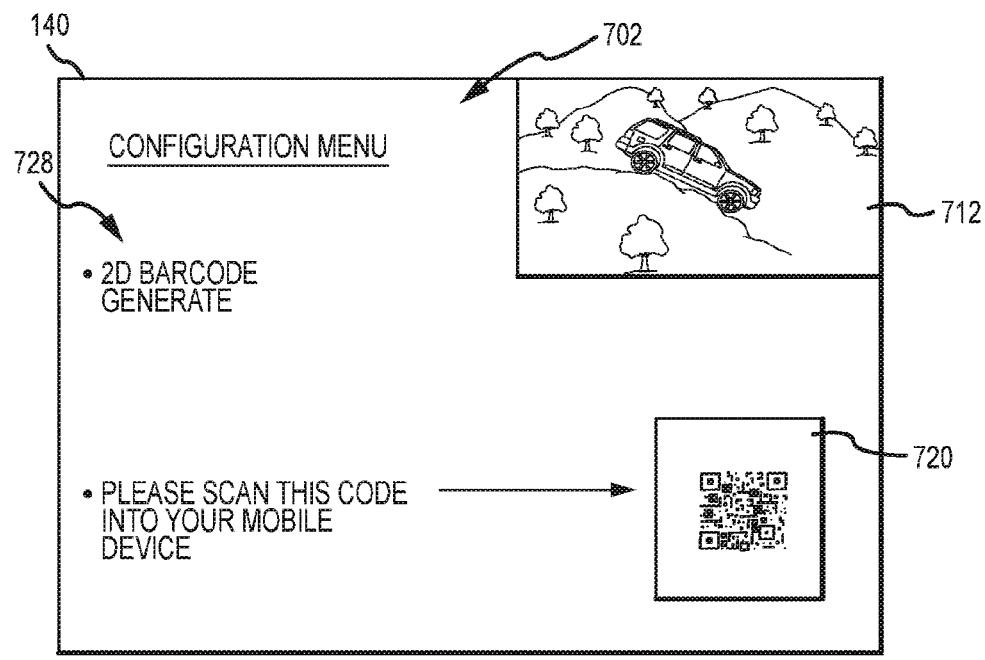

FIGS. 7A and 7B are illustrations of graphical user interfaces or menus used to program various features of the television receiver 108 and/or remote control 144, and to store those configurations in a location that is separate from the television receiver 104. FIG. 7a includes a configuration menu 708 that includes a window 712 which includes a scaled or reduced version of the program content typically output from the display device 140. The configuration menu 720 additionally includes a number of sub menus that may be used to program various features of the television receiver 104. For example, the configuration menu 702 may include favorite channels sub-menu 704 that may be used to compile a list of channels that the user typically views during the day. The favorite channels menu 704 may be accessed when needed to view the user's favorite channels in an efficient and speedy manner. The configuration menu 702 may additionally include a recording timers sub-menu 708. The recording timers sub-menu 708 may include a listing of certain events or programs that the user has programmed or scheduled to be recorded by the recorder 136. The configuration menu 702 may additionally include a remote settings sub-menu 716. The remote settings sub-menu 716 may be used to program certain buttons or other input mechanisms on the user input device 144 with specific user defined functionality. The configuration menu 702 may additionally include a message 724 that instructs the user to select a certain button or enter a certain command to generate a two-dimensional barcode that will preserve the various settings established through the use of the configuration menu 702.

FIG. 7B includes a subsequent menu or screen utilized by the configuration menu 702. The screen or menu shown in FIG. 7B is displayed in response to a user selecting or instructing the generation of the two-dimensional barcode. The menu 702 shown in FIG. 7B includes a message that informs the user that the two-dimensional barcode has been generated and/or instructs the user to scan the two-dimensional barcode 720 into his or her mobile device 156.

Figure 8:
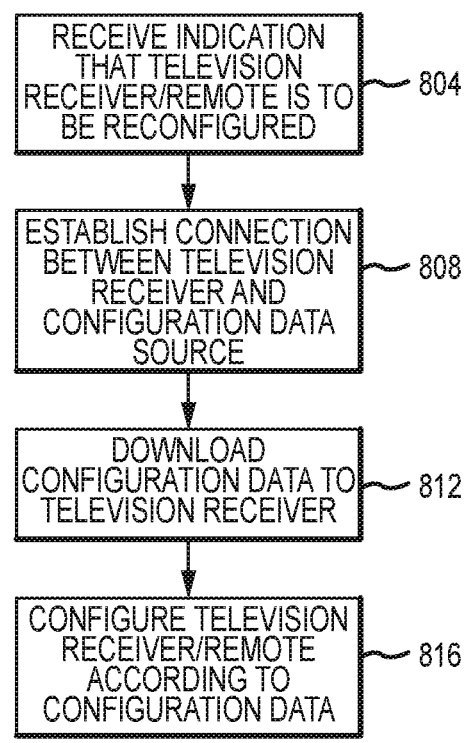
FIG. 8 is a flow chart that illustrates another method executed by the television receiver illustrated in FIG. 1.

FIG. 8 is a flow chart illustrating method of preserving the configurations associated with television receiver and/or remote control. Initially, in operation 804, the configuration sensing module 110 receives an indication that the television receiver 108 and/or remote 144 is to be reconfigured. Reconfiguring may occur, for example, when the television receiver 108 is reprogrammed or updated in a way that erases previous settings. Alternatively, the receiver 108 may have experienced a catastrophic failure that requires reconfiguring. In other instances, the service provider 104 may in fact replace the user's existing television receiver 108 with a more updated or improved receiver. Following operation 804, operation 808 may be executed.

In operation 808, the television receiver 108 establishes a connection between a television receiver 108 and a configuration data source. The configuration data source may, in one embodiment, be the storage device 160 associated with the mobile device 156. In other embodiments, the configuration data source may be the database 180. Establishing the connection may include initiating a network connection across the network 176, if the receiver 108 has such functionality. In other embodiments, the connection may be established through a USB port or other communication port associated with the receiver 108.

Following operation 808, operation 812 may be executed. In operation 812, the television receiver 108 downloads the configuration data into the television receiver 108. Following operation 812, operation 816 may be executed. In operation 816, the television receiver may configure itself or the remote 144 according to the configuration data acquired in operation 812.

By way of example and not limitation, some system elements described herein such as the condition sensing module 110, the encoding module 112, the output module 116 and the configuration module 120 are depicted in the figures as processor executable software or code elements that are stored in a stored in a storage device 152. However, it should be appreciated that some system designs consistent with the teachings described herein may implement separate modules within a television receiver that serve the functions implemented by the illustrated condition sensing module 110, the encoding module 112, the output module 116 and the configuration module 120. Such modules may include hardware and/or software elements that are implemented apart from the storage device 152. In some embodiments, such separate modules may utilize the storage device 152 for such purposes as loading and/or storing data.

While embodiments are discussed herein in connection with a exemplary satellite or cable broadcast system, it should be appreciated that embodiments may be used in connection other types of networks or content delivery mechanisms. Generally, the disclosure includes content delivered from a provider to a receiver across or over a network. The network across which content may be delivered may include satellite or cable system. Alternatively, the network may include a local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 4, FIG. 5, FIG. 6 and FIG. 8, described herein is by way of example and limitation. Certain implementations may reorder method operations without departing from the spirit and scope of the disclosure.

The invention claimed is:

1. A method of managing a television receiver, comprising:
sensing a condition of a television receiver;
in response to sensing the condition of the television receiver, creating a two-dimensional barcode with information corresponding to configuration settings of the television receiver, the information comprising settings information corresponding to user-adjustable settings;
outputting the two-dimensional barcode from the television receiver for display on a display device;
wherein, when the two-dimensional barcode is scanned from the display device into a mobile device, the two-dimensional barcode conveys the information corresponding to the configuration settings to the mobile device, so that the mobile device obtains the information for later use by the television receiver;
subsequently communicating, by the television receiver with the mobile device, to transfer the information corresponding to the configuration settings from the mobile device to the television receiver; and
self-configuring, by the television receiver, based at least in part on the information corresponding to the configuration settings transferred from the mobile device to the television receiver, including the settings information corresponding to the user-adjustable settings.

2. The method of claim 1, further comprising:
receiving a request to reconfigure the television receiver according to the information corresponding to the configuration settings retained by the mobile device;
where the communicating, by the television receiver with the mobile device, is responsive to the request and comprises establishing a connection from the television receiver to a storage medium on which the mobile device has stored the information corresponding to the configuration settings.

3. The method of claim 1, wherein the condition corresponds to one or more user-adjustable settings for the television receiver, and the sensing is executed in response to receiving a user request at the television receiver to save the one or more user-adjustable settings.

4. The method of claim 1, wherein the condition of the television receiver is an error condition occurring during an operation of the television receiver, and the method further comprises:
determining that the error condition will result in an imminent failure of an internal component of the television receiver;
wherein the creating the two-dimensional barcode with information corresponding to configuration settings of the television receiver is in response to the determining.

5. The method of claim 4, further comprising:
developing a second two-dimensional barcode based on a corresponding error code, wherein the developing includes encoding the second two-dimensional barcode with routing information; and
outputting the second two-dimensional barcode from the television receiver for display on the display device;
wherein, when the second two-dimensional barcode is scanned from the display device into the mobile device, the second two-dimensional barcode conveys the routing information to the mobile device, so that the mobile device obtains the information to access a remote site with the routing information and direct error information regarding the error condition to a service provider capable of mitigating the error condition.

6. The method of claim 5, wherein:
the routing information includes a uniform resource locator configured to access a website through a browser operating on the mobile device; and
the website is configured to communicate the error condition to the service provider using information obtained by scanning the second two-dimensional barcode.

7. The method of claim 5, wherein the routing information causes the mobile device to automatically launch an application that is configured to communicate with the service provider.

8. The method of claim 1, wherein the two-dimensional barcode is additionally created with second information corresponding to configuration settings of a user input device configured to communicate to the television receiver, and, when the two-dimensional barcode is scanned from the display device into the mobile device, the two-dimensional barcode conveys the second information to the mobile device so that the mobile device obtains the second information for later use in input device reconfiguration.

9. A method, comprising:
scanning a two-dimensional barcode into a mobile device, the two-dimensional barcode:
being displayed on a display device associated with a television receiver;

and created with information corresponding to configuration settings of a television receiver in response to a condition of the television receiver, the information comprising settings information corresponding to user-adjustable settings;

wherein, when the two-dimensional barcode is scanned from the display device into the mobile device, the two-dimensional barcode conveys the information corresponding to the configuration settings to the mobile device, so that the mobile device obtains the information for later use by the television receiver;

decoding the two-dimensional barcode at the mobile device to determine the information corresponding to the configuration settings to the mobile device;

storing the information corresponding to the configuration settings for later use in reconfiguring the television receiver; and subsequently communicating with the television receiver to transfer the information corresponding to the configuration settings from the mobile device to the television receiver to reconfigure the television receiver based at least in part on the information, including the settings information corresponding to the user-adjustable settings.

10. The method of claim 9, wherein the information corresponding to the configuration settings includes a configuration setting for a remote control device associated with the television receiver.

11. The method of claim 9, wherein the storing the information corresponding to the configuration settings comprises:
   establishing a network connection between the mobile device and a storage device that is remote from the mobile device;
   transmitting the storing the information corresponding to the configuration settings from the mobile device to the storage device across the network connection; and
   storing the information corresponding to the configuration settings at the storage device.

12. The method of claim 9, further comprising:
   receiving a request to reconfigure the television receiver according to the information corresponding to the configuration settings retained by the mobile device;
   where the communicating comprises establishing a connection between the television receiver and a storage medium on which the mobile device has stored the information corresponding to the configuration settings.

13. A television receiver, comprising:
   a tuner operable to receive a program service transmission having a plurality of channels, the tuner operable to select one of the channels and to prepare the channel to be output in a data signal to a display device;
   a memory connected to the tuner, the memory including a tangible storage medium operable to store computer readable data and instructions;
   a processor connected to the memory operable to run computer executable code stored in the memory;
   a sensing module configured to execute on the processor to sense a condition of the television receiver;
   an encoding module configured to execute on the processor to create, in response to sensing the condition of the television receiver, a two-dimensional barcode with information corresponding to configuration settings of the television receiver, the information comprising settings information corresponding to user-adjustable settings;
   an output module configured to execute on the processor to output the two-dimensional barcode from the television receiver for display on the display device;
   wherein, when the two-dimensional barcode is scanned from the display device into a mobile device, the two-dimensional barcode conveys the information corresponding to the configuration settings to the mobile device, so that the mobile device obtains the information for later use by the television receiver; and
   a configuration module configured to execute on the processor to:
      subsequently communicate with the mobile device to transfer the information corresponding to the configuration settings from the mobile device to the television receiver; and
      configuring the television receiver, based at least in part on the information corresponding to the configuration settings transferred from the mobile device to the television receiver, including the settings information corresponding to the user-adjustable settings.

14. The television receiver of claim 13, wherein the communicating comprises connecting to a storage medium used by the mobile device to store the information corresponding to the configuration settings, to download the settings information corresponding to the user-adjustable settings, and wherein the configuring the television receiver comprises setting the television receiver according to the settings information.

15. The television receiver of claim 13, further comprising:
   a recorder operable to a record and store a program associated with a channel of the program service transmission;
   wherein the settings information includes a recording timer configured to cause the recorder to record a particular program.

16. The television receiver of claim 13, the configuration module to receive a request to reconfigure the television receiver according to the information corresponding to the configuration settings retained by the mobile device, where the communicating is responsive to the request and comprises establishing a connection from the television receiver to a storage medium on which the mobile device has stored the information corresponding to the configuration settings.

17. The television receiver of claim 13, wherein:
   the condition corresponds to one or more user-adjustable settings for the television receiver, and
   the sensing is executed in response to receiving a user request at the television receiver to save the one or more user-adjustable settings.

18. The television receiver of claim 13, wherein:
   the condition of the television receiver is an error condition occurring during an operation of the television receiver;
   the television receiver is configured to determine whether the error condition will result in an imminent failure of an internal component of the television receiver; and
   the creating the two-dimensional barcode with information corresponding to configuration settings of the television receiver is in response to determining that the error condition will result in an imminent failure of an internal component of the television receiver.

19. The television receiver of claim 18, wherein:
   the encoding module is further configured to develop a second two-dimensional barcode based on a corresponding error code, wherein the developing includes encoding the second two-dimensional barcode with routing information; and the output module is further configured to output the second two-dimensional barcode from the television receiver for display on the display device;

wherein, when the second two-dimensional barcode is scanned from the display device into the mobile device, the second two-dimensional barcode conveys the routing information to the mobile device, so that the mobile device obtains the information to access a remote site with the routing information and direct error information regarding the error condition to a service provider capable of mitigating the error condition.

20. The television receiver of claim 19, wherein:

the routing information includes a uniform resource locator configured to access a website through a browser operating on the mobile device; and the website is configured to communicate the error condition to the service provider using information obtained by scanning the second two-dimensional barcode.

* * * * *